US008670486B2

(12) United States Patent
Hannuksela (10) Patent No.: US 8,670,486 B2
(45) Date of Patent: Mar. 11, 2014

(54) PARAMETER FOR RECEIVING AND BUFFERING PICTURES

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 1284 days.

(21) Appl. No.: 10/782,399

(22) Filed: Feb. 18, 2004

(65) Prior Publication Data

US 2004/0223551 A1    Nov. 11, 2004

Related U.S. Application Data

(60) Provisional application No. 60/448,693, filed on Feb. 18, 2003, provisional application No. 60/483,159, filed on Jun. 27, 2003.

(51) Int. Cl.
  *H04N 7/12*   (2006.01)
  *H04N 11/02*  (2006.01)
  *H04N 11/04*  (2006.01)

(52) U.S. Cl.
  USPC ................................ 375/240.25; 375/240.01

(58) Field of Classification Search
  USPC ........................... 375/240.25, 240.12, 240.01
  See application file for complete search history.

(56) References Cited

U.S. PATENT DOCUMENTS

| 5,122,875 | A |   | 6/1992  | Raychaudhuri et al. |
|-----------|---|---|---------|---------------------|
| 5,313,186 | A |   | 5/1994  | Schuhl et al.       |
| 5,378,683 | A |   | 1/1995  | Cabanel et al.      |
| 5,387,941 | A |   | 2/1995  | Montgomery et al.   |
| 5,398,072 | A | * | 3/1995  | Auld .......... 375/240.25 |
| 5,467,173 | A |   | 11/1995 | Sakata et al.       |
| 5,481,543 | A |   | 1/1996  | Veltman             |
| 5,481,643 | A |   | 1/1996  | Ten Kate et al.     |
| 5,486,864 | A |   | 1/1996  | Zdepski             |
| 5,517,250 | A |   | 5/1996  | Hoogenboom et al.   |
| 5,677,905 | A |   | 10/1997 | Bingham et al.      |
| 5,719,632 | A |   | 2/1998  | Hoang et al.        |
| 5,815,600 | A |   | 9/1998  | Sano et al.         |
| 5,822,024 | A |   | 10/1998 | Setogawa et al.     |
| 5,877,812 | A |   | 3/1999  | Krause et al.       |
| 5,887,812 | A |   | 3/1999  | Lauble et al.       |
| 5,892,924 | A |   | 4/1999  | Lyon et al.         |

(Continued)

FOREIGN PATENT DOCUMENTS

| CN | 1279856 A | 1/2001 |
|----|-----------|--------|
| CN | 1280743 A | 1/2001 |

(Continued)

OTHER PUBLICATIONS

Chinese Office Action (English Translation) issued Mar. 7, 2008 in corresponding Chinese Patent Application No. 200480004552.4 (40 pages).

(Continued)

*Primary Examiner* — Marsha D. Banks
*Assistant Examiner* — Chikaodili E Anyikire
(74) *Attorney, Agent, or Firm* — Alston & Bird LLP (57) ABSTRACT

The invention relates to a method for buffering multimedia information, wherein a parameter is defined indicative of the maximum amount of transmission units comprising multimedia data that precede any transmission unit comprising multimedia data in the packet stream in transmission unit transmission order and follow the transmission unit comprising multimedia data in decoding order. The invention also relates to a system, a transmitting device, a receiving device, a computer program product, a signal and a module.

36 Claims, 6 Drawing Sheets

(56) References Cited

U.S. PATENT DOCUMENTS

| | | | |
|---|---|---|---|
| 6,011,590 A | 1/2000 | Saukkonen | |
| 6,023,233 A | 2/2000 | Craven et al. | |
| 6,141,785 A | 10/2000 | Hur | |
| 6,188,700 B1 | 2/2001 | Kato et al. | |
| 6,191,581 B1 | 2/2001 | Van Dau et al. | |
| 6,269,080 B1 | 7/2001 | Kumar | |
| 6,289,129 B1* | 9/2001 | Chen et al. | 382/232 |
| 6,291,993 B1 | 9/2001 | Fert et al. | |
| 6,493,388 B1 | 12/2002 | Wang | |
| 6,496,004 B1 | 12/2002 | Nguyen Van Dau et al. | |
| 6,496,980 B1 | 12/2002 | Tillman et al. | |
| 6,526,022 B1 | 2/2003 | Chiu | |
| 6,618,438 B1 | 9/2003 | Le Roux et al. | |
| 6,625,320 B1 | 9/2003 | Nilsson et al. | |
| 6,628,719 B1 | 9/2003 | Kono et al. | |
| 6,697,426 B1 | 2/2004 | Van Der Schaar et al. | |
| 6,754,275 B1* | 6/2004 | Yasuda et al. | 375/240.25 |
| 6,782,490 B2 | 8/2004 | Maxemchuk et al. | |
| 6,873,786 B2 | 3/2005 | Lin et al. | |
| 6,950,466 B2 | 9/2005 | Kim et al. | |
| 7,072,404 B2 | 7/2006 | Itokawa | |
| 7,289,500 B1 | 10/2007 | Amlekar | |
| 7,296,205 B2 | 11/2007 | Curcio et al. | |
| 7,301,944 B1 | 11/2007 | Redmond | |
| 7,356,079 B2 | 4/2008 | Laksono et al. | |
| 7,495,867 B2 | 2/2009 | Sbiaa et al. | |
| 7,526,523 B2 | 4/2009 | Nekovee et al. | |
| 7,551,672 B1 | 6/2009 | Tahara et al. | |
| 7,809,240 B2 | 10/2010 | Nomura | |
| 8,108,747 B2 | 1/2012 | Curcio et al. | |
| 8,160,134 B2 | 4/2012 | Tahara et al. | |
| 2001/0049291 A1 | 12/2001 | Sato et al. | |
| 2002/0003799 A1* | 1/2002 | Tomita | 370/392 |
| 2002/0004840 A1* | 1/2002 | Harumoto et al. | 709/231 |
| 2002/0071485 A1 | 6/2002 | Caglar | |
| 2002/0095636 A1 | 7/2002 | Tatsumi et al. | |
| 2002/0105951 A1* | 8/2002 | Hannuksela et al. | 370/389 |
| 2002/0174442 A1 | 11/2002 | Nomura | |
| 2003/0031175 A1 | 2/2003 | Hayashi et al. | |
| 2003/0135784 A1 | 7/2003 | Yamaguchi et al. | |
| 2003/0138043 A1 | 7/2003 | Hannuksela | |
| 2003/0142689 A1 | 7/2003 | Haberman et al. | |
| 2003/0169815 A1 | 9/2003 | Aggarwal et al. | |
| 2004/0005007 A1* | 1/2004 | Viscito et al. | 375/240.25 |
| 2004/0010802 A1 | 1/2004 | Visharam et al. | |
| 2004/0039796 A1 | 2/2004 | Watkins | |
| 2004/0205071 A1 | 10/2004 | Uesugi et al. | |
| 2004/0228413 A1 | 11/2004 | Hannuksela | |
| 2005/0123055 A1 | 6/2005 | Winger | |
| 2005/0135020 A1 | 6/2005 | Sugita et al. | |
| 2005/0201471 A1 | 9/2005 | Hannuksela et al. | |
| 2006/0072597 A1 | 4/2006 | Hannuksela | |
| 2007/0002503 A1 | 1/2007 | Sbiaa et al. | |
| 2007/0030603 A1 | 2/2007 | Sato et al. | |
| 2007/0035888 A1 | 2/2007 | Sbiaa et al. | |
| 2007/0086120 A1 | 4/2007 | Shimazawa et al. | |
| 2007/0159164 A1 | 7/2007 | Hehn et al. | |
| 2009/0122658 A1 | 5/2009 | Gaudin et al. | |
| 2009/0128965 A1 | 5/2009 | Mizuno et al. | |
| 2011/0019747 A1 | 1/2011 | Hannuksela et al. | |

FOREIGN PATENT DOCUMENTS

| | | |
|---|---|---|
| CN | 1280753 A | 1/2001 |
| CN | 1358388 A | 7/2002 |
| EP | 0 944 269 | 9/1999 |
| EP | 0 949 819 | 10/1999 |
| EP | 0 981 249 | 2/2000 |
| EP | 1069777 A1 | 1/2001 |
| EP | 1146683 | 10/2001 |
| EP | 1185033 A1 | 3/2002 |
| EP | 1 379 085 | 1/2004 |
| FR | 2852399 A1 | 9/2004 |
| GB | 2287383 A | 9/1995 |
| JP | 2001045020 A | 2/2001 |
| JP | 2001298407 | 10/2001 |
| JP | 2002112265 | 4/2002 |
| JP | 2002330379 | 11/2002 |
| JP | 2002359641 | 12/2002 |
| JP | 2003008642 | 1/2003 |
| RU | 2 115 261 | 7/1998 |
| RU | 2189072 | 9/2002 |
| WO | 96/20575 | 7/1996 |
| WO | 9620575 | 7/1996 |
| WO | 97/28505 | 8/1997 |
| WO | WO-9801764 A1 | 1/1998 |
| WO | WO 99/16225 | 4/1999 |
| WO | WO-9927379 A1 | 6/1999 |
| WO | WO-0036429 A1 | 6/2000 |
| WO | WO-00/46995 | 10/2000 |
| WO | WO 00/67469 | 11/2000 |
| WO | WO 2004/019530 | 3/2004 |
| WO | WO 2004/075555 | 9/2004 |
| WO | WO-2004083881 A1 | 9/2004 |

OTHER PUBLICATIONS

Decision on Grant for parallel Russian Application No. 2005129107 dated Jun. 5, 2009, 11 pages original Decision, 7 pages English translation of text of Decision, 17 pages total.

Joint Video Team (JVT) of ISO/IEC MPEG and ITU-T VCEG, HRD Editor's Input to Final Committee Draft (FCD) of Joint Video Specification (ITU-T Rec. H.264 ISCMEC 14496-10 AVC) regarding Hypothetical Reference Decoder, 4th Meeting: Klagenfurt, Austria, Jul. 22-26, 2002, pp. 1-18.

Swedish Patent Office; Henrik Andersson; "International Search Report"; whole document; Jun. 21, 2004.

Patent Office of the People's Republic of China; Li Ping; "First Office Action"; whole document; Mar. 7, 2008; English translation only.

Journal of Software, vol. 12, No. 8; W. Wang et al.; "An Index Model for MPEG-2 Streams and Its Application"; pp. 1212-1219; Dec. 2001; with English abstract.

Mexican Patent Office; "Official Action"; whole document; May 28, 2008; with partial English translation.

Swedish Patent Office; Jesper Bergstrand; "International Search Report"; whole document; Jun. 8, 2005.

Intellectual Property Office of Singapore; Steffen Skanning; "Written Opinion"; whole document; Jul. 17, 2008.

Japanese Patent Office; Masaru Kawasaki; "Notice of Reasons for Rejection"; whole document; Nov. 24, 2009; with English translation.

Network Working Group; S. Wenger et al.; "RTP Payload Format for H.264 Video"; whole document; Aug. 2004.

Federal Service for Intellectual Property, Patents and Trademarks (Russian Patent Office); "Decision to Grant a Patent for an Invention"; whole document; Oct. 1, 2009; with English translation.

English translation of abstract for RU 2 115 261, dated Jul. 10, 1998.

Joint Video Team (JVT) of ISO/IEC MPEG and ITU/T VCEG; "HRD Editor's Input to Final Committee Draft (FCD) of joint Video Specification (ITU-T Rec. H.264 / ISO/IEC 14496-10 AVC) regarding Hypothetical Reference Decoder"; whole document; Jul. 22-26, 2002; Austria.

Joint Video Team (JVT) of ISO/IEC MPEG and ITU/T VCEG; "Study of Final Committee Draft of Joint Video Specification (ITU-T Rec. H.264 / ISO/IEC 14496-10 AVC)"; whole document; Dec. 5-13, 2002; Awaji Island.

Canadian Office Action, Application No. 2,515,354 dated Jul. 15, 2009, 5 pages.

English Abstract of Japanese Patent Publication No. 2001298407, "Retransmission control Method in Multi-Cast Service Providing System, Information Distribution Unit and Wireless Terminal," published Oct. 26, 2001 (1 page).

English Abstract of Japanese Patent Publication No. 2002359641, "File Distribution System, file Distribution Server Unit, and Reception Client Unit," published Dec. 13, 2002 (1 page).

English language machine translation of Japanese Patent Publication No. 2003008642, "Multi-Cast Communication Method and System," published Jan. 10, 2003 (15 pages) including 1 page English Abstract.

(56) References Cited

OTHER PUBLICATIONS

Canadian Office Action mailed Aug. 20, 2010 in corresponding Canadian Patent Application No. 2,556,120 (5 pages).
Canadian Office Action mailed Jul. 15, 2010 in Canadian Patent Application No. 2,555,282 which is a parallel application to related U.S. Appl. No. 10/782,371 which issued as US Patent No. 7,296,205 (4 pages).
Wenger et al.; "RTP payload Format for H.264 Video; draft-ieft-avt-rtp-h264-02.txt", IETF Standard-Working-Draft, Internet Engineering Task Force, IETF, CH, vol. avt, No. 2, Jul. 2, 2003, XP105001402, ISSN: 0000-0004, whole document.
European Office Action mailed Mar. 9, 2011 in parallel EP Application No. 04711624.9 (6 pages).
Wenger et al.; "RTP payload Format for H.264 Video; draft-ieft-avt-rtp-h264-02,txt", IETF Standard-Working-Draft, Internet Engineering Task Force, IETF, CH, vol. avt, No. 2, Jun. 26, 2003 (56 pages).
"Information Technology Vocabulary. Fundamental Terms," ISO/IEC 2382-1:1993, <www.mprepc.ru/informatisation/iso2381-1.html>, Feb. 15, 1994.
3GPP TS 23.246, V.6.1.0 (Dec. 2003), Technical Specification, 3rd Generation Partnership Project; Technical Specification Group Services and System Aspects; Multimedia Broadcast/Multicast Service (MBMS); Architecture and Functional Description (Release 6), 38 pages.
Adamson et al., "NACK-Oriented Reliable Multicast Protocol (NORM)," Internet Draft, Jan. 2004, 67 pages.
Hannuksela, Miska M., "Levels and HRD," ITU Study Group 16—Video Coding Experts Group—ISO/IEC MPEG & ITU-T VCEG (ISO/IECJTC1/SC29/WG11 and ITU-T SG16 Q6), JVT-C069, May 10, 2002.
International Search Report and Written Opinion from International Appl. No. PCT/FI2005/050033, dated May 25, 2005.
Luby et al., "Asynchronous Layered Coding (ALC) Protocol Instantiation," RFC 3450, Dec. 2002, 30 pages.
Luby et al., "Forward Error Correction (FEC) Building Block," RFC 3452, Dec. 2002, 15 pages.
Office Action from EP Appl. No. 04711624.9, dated Nov. 10, 2011.
Office Action from EP Appl. No. 05708200.0 dated Mar. 23, 2011.
Office Action from Japanese Appl. No. 2006-552650, dated Oct. 23, 2009.
Office Action from Taiwanese Appl. No. 094104145, dated Sep. 26, 2011.
Paila et al., "FLUTE-File Delivery over Unidirectional Transport," Internet Draft, Dec. 2003, 28 pages.
Search Report from Singapore Appl. No. SG-2006-05400-1, dated Jun. 25, 2008.
Stockhammer et al., "H.264/AVC in Wireless Environments," *IEEE Transactions on Circuits and Systems for Video Technology*, vol. 13, No. 7, Jul. 2003, pp. 657-673.
Stockhammer et al., "H.264/JVT Coding Network Abstraction Layer and IP-Based Transport," *Proceedings of the IEEE 2002 International Conference on Image Processing*, Sep. 22-25, 2002, vol. 2, pp. II-485-II-488.
Wang et al., "System and Transport Interface of SVC," *IEEE Transactions on Circuits and Systems for Video Technology*, vol. 17, No. 9, Sep. 2007, pp. 1149-1163.
Wenger et al., "RTP Payload Format for H.264 Video," Internet Draft draft.ietf-avt-rtp-h264-04.txt, Feb. 10, 2004, http://www.ietf.org/proceedings/59/I-D/draft-ietf-avt-rtp-264.4.txt, 76 pages.
Wenger et al., "RTP Payload Format for H.264 Video," Internet Draft draft-ietf-avt-rtp-h264-03.txt, IETF Standard-Working-Draft, Internet Engineering Task Force, IETF, CH, vol. Avt, No. 3, Oct. 2003.
Office Action for U.S. Appl. No. 10/782,372 dated Jul. 18, 2012.
Japanese Office Action for Application No. 2009-141863, dated Oct. 10, 2012.
Miska M. Hannuksela, "Signaling of Enhanced GOPs", Joint Video Team (JVT) of ISO/IEC MPEG & IUT-T VCEG (ISO/IEC JTC1/SC29/WG11 and ITU-T SG16Q6), Jul. 22-26, 2002, Document: JVT-D098 (9 pages).
Miska M. Hannuksela, "On NAL Unit Order", Joint Video Team (JVT) of ISO/IEC MPEG & ITU-T VCEG (ISO/IECJTC1/SC29/WG11 and ITU-T SG16 Q6), Jul. 22-26, 2002, Document: JVT-DO93 (7 pages).
Gary Sullivan, "Question 6/16: Advanced Video Coding", Temporary Document 10, ITU-T Draft Study Period 2001-2004, International Telecommunication Union, Geneva, CH, vol. Study Group 16, Report of Activities at Interim Meetings in Klagenfurt, Austria, May 6-10, 2002 (76 pages).
J. Van Der Meer, "RTP Payload format for Transport of MPEG-4 Elementary Streams", Internet Engineering Task Force, Internet Draft, Document: draft-ietf-avt-mpeg4-simple-07.txt; Feb. 1, 2003 (41 pages).
Internet Draft: draft-ietf-avt-rtp-h264-01.txt, "RTP payload Format for JVT Video", 24 page document, Feb. 2003.
Internet Draft, Document: draft-ietf-avt-rtp-h264-00.txt, Expires: Mar. 2003, S. Wenger, M. Hannuksela, T. Stockhammer, dated Sep. 21, 2002, "RTP payload Format for JVT Video", 16 pages.
Communication pursuant to Article 94(3) EPC, EPA 04 711 623.1-2223 (related application), Mar. 7, 2012, 6 pages.
Mexican Office Action issued May 9, 2008 in corresponding Mexican Patent Application No. PA/a/2005/008404 (4 pages).
English Translation of Mexican Office Action issued May 9, 2008 in corresponding Mexican Patent Application No. PA/a/2005/008404 (3 pages).
European communication for Application No. 04711624.9, dated Oct. 24, 2013.
Magnus Westerlund: "Re: [AVT]1-0ACTION: draft-ietf-avtrtph264-01.txt", Mar. 7, 2003, XP055084330, Retrieved from the Internet: URL:https://www.ietf.org/mail-archive/web/avtlcurrenti__msg02205.html [retrieved on Oct. 17, 2013.

* cited by examiner

PARAMETER FOR RECEIVING AND BUFFERING PICTURES

CROSS-REFERENCE TO RELATED APPLICATIONS

This application claims priority from U.S. provisional application Ser. No. 60/448,693 filed Feb. 18, 2003 and from U.S. provisional application Ser. No. 60/483,159 filed Jun. 27, 2003.

FIELD OF THE INVENTION

The present invention relates to a method for buffering multimedia information. The invention also relates to a method for decoding encoded picture stream in a decoder, in which the encoded picture stream is received as transmission units comprising multimedia data. The invention further relates to a system, a transmitting device, receiving device, a computer program product, a signal, and a module.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.
Video Communication Systems Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming. A short review of the most important standards in these technology areas is given below.

A dominant standard in digital video consumer electronics today is MPEG-2, which includes specifications for video compression, audio compression, storage, and transport. The storage and transport of coded video is based on the concept of an elementary stream. An elementary stream consists of coded data from a single source (e.g. video) plus ancillary data needed for synchronization, identification and characterization of the source information. An elementary stream is packetized into either constant-length or variable-length packets to form a Packetized Elementary Stream (PES). Each PES packet consists of a header followed by stream data called the payload. PES packets from various elementary streams are combined to form either a Program Stream (PS) or a Transport Stream (TS). PS is aimed at applications having negligible transmission errors, such as store-and-play type of applications. TS is aimed at applications that are susceptible of transmission errors. However, TS assumes that the network throughput is guaranteed to be constant.

The Joint Video Team (JVT) of ITU-T and ISO/IEC has released a standard draft which includes the same standard text as ITU-T Recommendation H.264 and ISO/IEC International Standard 14496-10 (MPEG-4 Part 10). The draft standard is referred to as the JVT coding standard in this paper, and the codec according to the draft standard is referred to as the JVT codec.

The codec specification itself distinguishes conceptually between a video coding layer (VCL), and a network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL are slices: a bit string that contains the macroblock data of an integer number of macroblocks, and the information of the slice header (containing the spatial address of the first macroblock in the slice, the initial quantization parameter, and similar). Macroblocks in slices are ordered in scan order unless a different macroblock allocation is specified, using the so-called Flexible Macroblock Ordering syntax. In-picture prediction is used only within a slice.

The NAL encapsulates the slice output of the VCL into Network Abstraction Layer Units (NALUs), which are suitable for the transmission over packet networks or the use in packet oriented multiplex environments. JVT's Annex B defines an encapsulation process to transmit such NALUs over byte-stream oriented networks.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Figure 1:
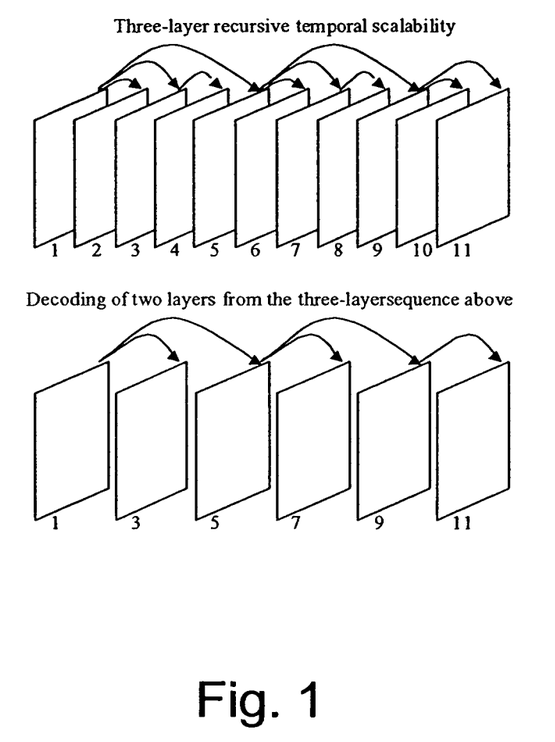
FIG. 1 shows an example of a recursive temporal scalability scheme.
Figure 2:
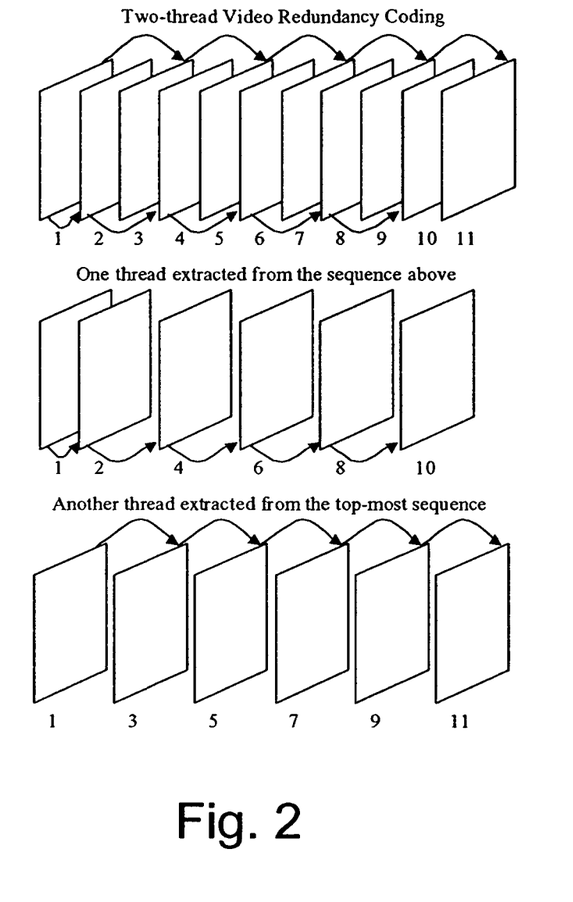
FIG. 2 depicts a scheme referred to as Video Redundancy Coding, where a sequence of pictures is divided into two or more independently coded threads in an interleaved manner.

Reference picture selection enables many types of temporal scalability schemes. FIG. 1 shows an example of a temporal scalability scheme, which is herein referred to as recursive temporal scalability. The example scheme can be decoded with three constant frame rates. FIG. 2 depicts a scheme referred to as Video Redundancy Coding, where a sequence of pictures is divided into two or more independently coded threads in an interleaved manner. The arrows in these and all the subsequent figures indicate the direction of motion compensation and the values under the frames correspond to the relative capturing and displaying times of the frames.
Transmission Order In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed of without affecting the decoding of any other pictures.

The JVT coding standard includes the following novel technical features compared to earlier standards:
 The decoding order of pictures is decoupled from the display order. The picture number indicates decoding order and the picture order count indicates the display order.
 Reference pictures for a block in a B picture can either be before or after the B picture in display order. Consequently, a B picture stands for a bi-predictive picture instead of a bi-directional picture.

Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)

A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

Figure 3:
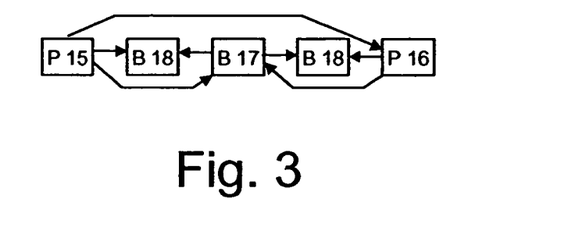
FIG. 3 presents an example of a prediction structure potentially improving compression efficiency.

An example of a prediction structure potentially improving compression efficiency is presented in FIG. 3. Boxes indicate pictures, capital letters within boxes indicate coding types, numbers within boxes are picture numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

Figure 4:
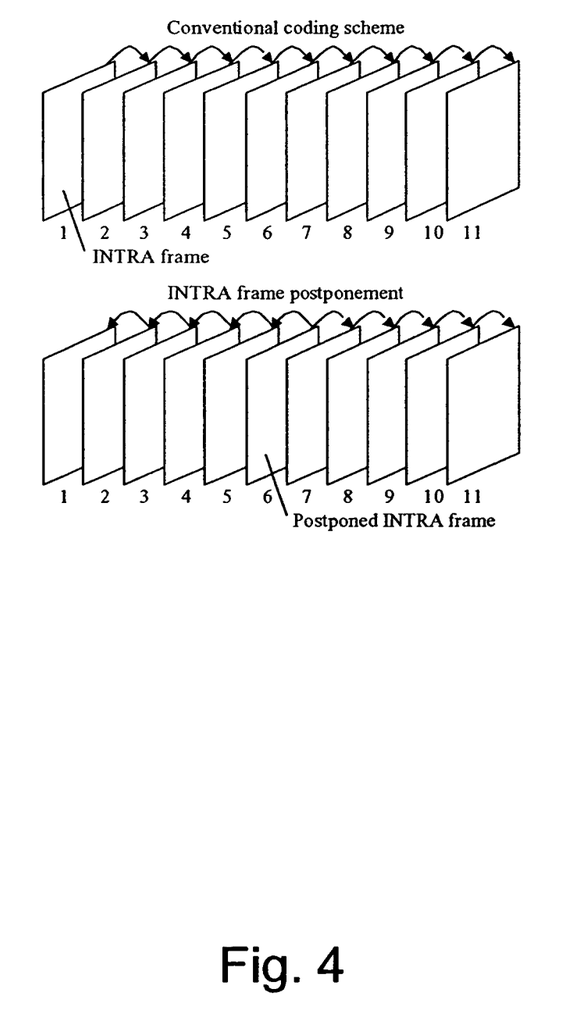
FIG. 4 presents an example of the intra picture postponement method that can be used to improve error resiliency.

FIG. 4 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 4 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

Two types of ordering and timing information have been conventionally associated with digital video: decoding and presentation order. A closer look at the related technology is taken below.

A decoding timestamp (DTS) indicates the time relative to a reference clock that a coded data unit is supposed to be decoded. If DTS is coded and transmitted, it serves for two purposes: First, if the decoding order of pictures differs from their output order, DTS indicates the decoding order explicitly. Second, DTS guarantees a certain pre-decoder buffering behavior provided that the reception rate is close to the transmission rate at any moment. In networks where the end-to-end latency varies, the second use of DTS plays no or little role. Instead, received data is decoded as fast as possible provided that there is room in the post-decoder buffer for uncompressed pictures.

Carriage of DTS depends on the communication system and video coding standard in use. In MPEG-2 Systems, DTS can optionally be transmitted as one item in the header of a PES packet. In the JVT coding standard, DTS can optionally be carried as a part of Supplemental Enhancement Information (SEI), and it is used in the operation of an optional Hypothetical Reference Decoder. In ISO Base Media File Format, DTS is dedicated its own box type, Decoding Time to Sample Box. In many systems, such as RTP-based streaming systems, DTS is not carried at all, because decoding order is assumed to be the same as transmission order and exact decoding time does not play an important role.

H.263 optional Annex U and Annex W.6.12 specify a picture number that is incremented by 1 relative to the previous reference picture in decoding order. In the JVT coding standard, the frame number coding element is specified similarly to the picture number of H.263. The JVT coding standard specifies a particular type of an intra picture, called an instantaneous decoder refresh (IDR) picture. No subsequent picture can refer to pictures that are earlier than the IDR picture in decoding order. An IDR picture is often coded as a response to a scene change. In the JVT coding standard, frame number is reset to 0 at an IDR picture in order to improve error resilience in case of a loss of the IDR picture as is presented in FIGS. 5a and 5b. However, it should be noted that the scene information SEI message of the JVT coding standard can also be used for detecting scene changes.

H.263 picture number can be used to recover the decoding order of reference pictures. Similarly, the JVT frame number can be used to recover the decoding order of frames between an IDR picture (inclusive) and the next IDR picture (exclusive) in decoding order. However, because the complementary reference field pairs (consecutive pictures coded as fields that are of different parity) share the same frame number, their decoding order cannot be reconstructed from the frame numbers.

The H.263 picture number or JVT frame number of a non-reference picture is specified to be equal to the picture or frame number of the previous reference picture in decoding order plus 1. If several non-reference pictures are consecutive in decoding order, they share the same picture or frame number. The picture or frame number of a non-reference picture is also the same as the picture or frame number of the following reference picture in decoding order. The decoding order of consecutive non-reference pictures can be recovered using the Temporal Reference (TR) coding element in H.263 or the Picture Order Count (POC) concept of the JVT coding standard.

A presentation timestamp (PTS) indicates the time relative to a reference clock when a picture is supposed to be displayed. A presentation timestamp is also called a display timestamp, output timestamp, and composition timestamp.

Carriage of PTS depends on the communication system and video coding standard in use. In MPEG-2 Systems, PTS can optionally be transmitted as one item in the header of a PES packet. In the JVT coding standard, PTS can optionally be carried as a part of Supplemental Enhancement Information (SEI). In ISO Base Media File Format, PTS is dedicated its own box type, Composition Time to Sample Box where the presentation timestamp is coded relative to the corresponding decoding timestamp. In RTP, the RTP timestamp in the RTP packet header corresponds to PTS.

Conventional video coding standards feature the Temporal Reference (TR) coding element that is similar to PTS in many aspects. In some of the conventional coding standards, such as MPEG-2 video, TR is reset to zero at the beginning of a Group of Pictures (GOP). In the JVT coding standard, there is no concept of time in the video coding layer. The Picture Order Count (POC) is specified for each frame and field and it is used similarly to TR in direct temporal prediction of B slices, for example. POC is reset to 0 at an IDR picture.

Buffering

Streaming clients typically have a receiver buffer that is capable of storing a relatively large amount of data. Initially, when a streaming session is established, a client does not start playing the stream back immediately, but rather it typically buffers the incoming data for a few seconds. This buffering helps to maintain continuous playback, because, in case of occasional increased transmission delays or network throughput drops, the client can decode and play buffered data. Otherwise, without initial buffering, the client has to freeze the display, stop decoding, and wait for incoming data. The buffering is also necessary for either automatic or selective retransmission in any protocol level. If any part of a picture is lost, a retransmission mechanism may be used to resend the lost data. If the retransmitted data is received before its scheduled decoding or playback time, the loss is perfectly recovered.

Coded pictures can be ranked according to their importance in the subjective quality of the decoded sequence. For example, non-reference pictures, such as conventional B pictures, are subjectively least important, because their absence does not affect decoding of any other pictures. Subjective ranking can also be made on data partition or slice group basis. Coded slices and data partitions that are subjectively the most important can be sent earlier than their decoding order indicates, whereas coded slices and data partitions that are subjectively the least important can be sent later than their natural coding order indicates. Consequently, any retransmitted parts of the most important slice and data partitions are more likely to be received before their scheduled decoding or playback time compared to the least important slices and data partitions.

Pre-Decoder Buffering

Pre-decoder buffering refers to buffering of coded data before it is decoded. Initial buffering refers to pre-decoder buffering at the beginning of a streaming session. Initial buffering is conventionally done for two reasons explained below.

In conversational packet-switched multimedia systems, e.g., in IP-based video conferencing systems, different types of media are normally carried in separate packets. Moreover, packets are typically carried on top of a best-effort network that cannot guarantee a constant transmission delay, but rather the delay may vary from packet to packet. Consequently, packets having the same presentation (playback) time-stamp may not be received at the same time, and the reception interval of two packets may not be the same as their presentation interval (in terms of time). Thus, in order to maintain playback synchronization between different media types and to maintain the correct playback rate, a multimedia terminal typically buffers received data for a short period (e.g. less than half a second) in order to smooth out delay variation. Herein, this type of a buffer component is referred as a delay jitter buffer. Buffering can take place before and/or after media data decoding.

Delay jitter buffering is also applied in streaming systems. Due to the fact that streaming is a non-conversational application, the delay jitter buffer required may be considerably larger than in conversational applications. When a streaming player has established a connection to a server and requested a multimedia stream to be downloaded, the server begins to transmit the desired stream. The player does not start playing the stream back immediately, but rather it typically buffers the incoming data for a certain period, typically a few seconds. Herein, this buffering is referred to as initial buffering. Initial buffering provides the ability to smooth out transmission delay variations in a manner similar to that provided by delay jitter buffering in conversational applications. In addition, it may enable the use of link, transport, and/or application layer retransmissions of lost protocol data units (PDUs). The player can decode and play buffered data while retransmitted PDUs may be received in time to be decoded and played back at the scheduled moment.

Initial buffering in streaming clients provides yet another advantage that cannot be achieved in conversational systems: it allows the data rate of the media transmitted from the server to vary. In other words, media packets can be temporarily transmitted faster or slower than their playback rate as long as the receiver buffer does not overflow or underflow. The fluctuation in the data rate may originate from two sources.

First, the compression efficiency achievable in some media types, such as video, depends on the contents of the source data. Consequently, if a stable quality is desired, the bit-rate of the resulting compressed bit-stream varies. Typically, a stable audio-visual quality is subjectively more pleasing than a varying quality. Thus, initial buffering enables a more pleasing audio-visual quality to be achieved compared with a system without initial buffering, such as a video conferencing system.

Second, it is commonly known that packet losses in fixed IP networks occur in bursts. In order to avoid bursty errors and high peak bit- and packet-rates, well-designed streaming servers schedule the transmission of packets carefully. Packets may not be sent precisely at the rate they are played back at the receiving end, but rather the servers may try to achieve a steady interval between transmitted packets. A server may also adjust the rate of packet transmission in accordance with prevailing network conditions, reducing the packet transmission rate when the network becomes congested and increasing it if network conditions allow, for example.

Transmission of Multimedia Streams

A multimedia streaming system consists of a streaming server and a number of players, which access the server via a network. The network is typically packet-oriented and provides little or no means to guaranteed quality of service. The players fetch either pre-stored or live multimedia content from the server and play it back in real-time while the content is being downloaded. The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

In order to avoid unlimited transmission delay, it is uncommon to favor reliable transport protocols in streaming systems. Instead, the systems prefer unreliable transport protocols, such as UDP, which, on one hand, inherit a more stable transmission delay, but, on the other hand, also suffer from data corruption or loss.

RTP and RTCP protocols can be used on top of UDP to control real-time communications. RTP provides means to detect losses of transmission packets, to reassemble the correct order of packets in the receiving end, and to associate a sampling time-stamp with each packet. RTCP conveys information about how large a portion of packets were correctly received, and, therefore, it can be used for flow control purposes.

In conventional video coding standards, the decoding order is coupled with the output order. In other words, the decoding order of I and P pictures is the same as their output order, and the decoding order of a B picture immediately follows the decoding order of the latter reference picture of the B picture in output order. Consequently, it is possible to recover the decoding order based on known output order. The output order is typically conveyed in the elementary video bitstream in the Temporal Reference (TR) field and also in the system multiplex layer, such as in the RTP header.

Some RTP payload specifications allow transmission of coded data out of decoding order. The amount of disorder is typically characterized by one value that is defined similarly in many relevant specifications. For example, in the draft RTP Payload Format for Transport of MPEG-4 Elementary Streams, the maxDisplacement parameter is specified as follows:

The maximum displacement in time of an access unit (AU, corresponding to a coded picture) is the maximum difference between the time stamp of an AU in the pattern and the time stamp of the earliest AU that is not yet present. In other words, when considering a sequence of interleaved AUs, then:

$$\text{Maximum displacement} = \max\{TS(i) - TS(j)\}, \text{ for any } i \text{ and any } j > i,$$

where i and j indicate the index of the AU in the interleaving pattern and TS denotes the time stamp of the AU It has been noticed in the present invention that in this method there are some problems and it gives too large value for the buffer.

SUMMARY OF THE INVENTION

An example of a scheme where the definition of the maximum displacement fails totally in specifying the buffering requirements (in terms of buffer space and initial buffering duration) follows. The sequence is spliced into pieces of 15 AUs, and the last AU in decoding and output order in such piece of 15 AU is transmitted first and all other AUs are transmitted in decoding and output order. Thus, the transmitted sequence of AUs is:
14 0 1 2 3 4 5 6 7 8 9 10 11 12 13 29 15 16 17 18 19 . . . .

The maximum displacement for this sequence is 14 for AU(14+k*15) (for all non-negative integer values of k).

However, the sequence requires buffer space and initial buffering for one AU only.

In the draft RTP payload format for H.264 (draft-ietf-avt-rtp-h264-01.txt), parameter num-reorder-VCL-NAL-units is specified as follows: This parameter may be used to signal the properties of a NAL unit stream or the capabilities of a transmitter or receiver implementation. The parameter specifies the maximum amount of VCL NAL units that precede any VCL NAL unit in the NAL unit stream in NAL unit decoding order and follow the VCL NAL unit in RTP sequence number order or in the composition order of the aggregation packet containing the VCL NAL unit. If the parameter is not present, num-reorder-VCL-NAL-units equal to 0 must be implied. The value of num-reorder-VCL-NAL-units must be an integer in the range from 0 to 32767, inclusive.

According to the H.264 standard VCL NAL units are specified as those NAL units having nal_unit_type equal to 1 to 5, inclusive. In the standard the following NAL unit types 1 to 5 are defined:

1 Coded slice of a non-IDR picture
2 Coded slice data partition A
3 Coded slice data partition B
4 Coded slice data partition C
5 Coded slice of an IDR picture The num-reorder-VCL-NAL-units parameter causes a similar problem to the problem presented for the maximum displacement parameter above. That is, it is impossible to conclude buffering space and initial buffering time requirements based on the parameter.

The invention enables signalling the size of the receiving buffer to the decoder.

In the following, an independent GOP consists of pictures from an IDR picture (inclusive) to the next IDR picture (exclusive) in decoding order.

In the present invention a parameter signalling the maximum amount of required buffering is defined more accurately than in prior art systems. In the following description the invention is described by using encoder-decoder based system, but it is obvious that the invention can also be implemented in systems in which the video signals are stored. The stored video signals can either be uncoded signals stored before encoding, as encoded signals stored after encoding, or as decoded signals stored after the encoding and decoding process. For example, an encoder produces bitstreams in transmission order. A file system receives audio and/or video bitstreams which are encapsulated e.g. in decoding order and stored as a file. The file can be stored into a database from which a streaming server can read the NAL units and encapsulate them into RTP packets.

Furthermore, in the following description the invention is described by using encoder-decoder based system, but it is obvious that the invention can also be implemented in systems where the encoder outputs and transmits coded data to another component, such as a streaming server, in a first order, where the other component reorders the coded data from the first order to another order, defines the required buffer size for the another order and forwards the coded data in its reordered form to the decoder.

According to a first aspect of the present invention there is provided a method comprising receiving media data and buffering said media data in a buffer, the media data being included in data transmission units, the data transmission units having been ordered in a transmission order which is at least partly different from a decoding order of the media data in the data transmission units, wherein a parameter is defined indicative of the maximum number of data transmission units that precede any transmission unit in a packet stream in transmission order and follow the transmission unit in the decoding order.

According to a second aspect of the present invention there is provided a method comprising receiving an encoded picture stream and decoding said encoded picture stream in a decoder, wherein the encoded picture stream is received as data transmission units comprising media data, the data transmission units having been ordered in a transmission order which is at least partly different from a decoding order of the media data in the data transmission units, wherein buffering of said data transmission units is performed, wherein buffering requirements are indicated for said decoding as a parameter indicative of a maximum number of data transmission units that precede any data transmission unit in the encoded picture stream in transmission order and follow the data transmission unit in the decoding order.

According to a third aspect of the present invention there is provided a system comprising an encoder for encoding pictures and a buffer for buffering media data, the media data being included in data transmission units, the data transmission units having been ordered in a transmission order which is at least partly different from a decoding order of the media data in the data transmission units, wherein a parameter is arranged to be defined indicative of a maximum number of data transmission units that precede any data transmission unit in the packet stream in transmission order and follow the data transmission unit in the decoding order.

According to a fourth aspect of the present invention there is provided a transmitting device for transmitting media data in data transmission units, the data transmission units ordered in a transmission order which is at least partly different from a decoding order of the media data in the data transmission units, wherein a parameter is arranged to be defined indicative of a maximum number of data transmission units that precede any data transmission unit in a packet stream in transmission order and follow the data transmission unit in the decoding order.

According to a fifth aspect of the present invention there is provided a receiving device for receiving an encoded picture stream as data transmission units comprising media data, the data transmission units ordered in a transmission order which is at least partly different from a decoding order of the media data in the data transmission units, wherein a parameter is arranged to be used indicative of a maximum number of data transmission units that precede any data transmission unit in the picture stream in transmission order and follow the data transmission unit in the decoding order.

According to a sixth aspect of the present invention there is provided a computer program product comprising a computer readable medium having program code stored thereon comprising machine executable steps for buffering media data of encoded pictures in a buffer, the media data being included in data transmission units, the data transmission units ordered in a transmission order which is at least partly different from a decoding order of the media data in the data transmission units, wherein the program code further comprises machine executable steps for defining a parameter indicative of a maximum number of data transmission units that precede any data transmission unit in the packet stream in transmission order and follow the data transmission unit in the decoding order.

According to a seventh aspect of the present invention there is provided a signal carrying media data included in data transmission units, the data transmission units ordered in a transmission order which is at least partly different from a decoding order of the media data in the data transmission units, wherein the signal includes a parameter indicative of a maximum number of data transmission units that precede any data transmission unit in the packet stream in transmission order and follow the data transmission unit in the decoding order.

According to an eighth aspect of the present invention there is provided a module for receiving an encoded picture stream as data transmission units comprising media data the data transmission units ordered in a transmission order which is at least partly different from a decoding order of the media data in the data transmission units, wherein a parameter is arranged to be used indicative of a maximum number of data transmission units that precede any data transmission unit in the packet stream in transmission order and follow the data transmission unit in the decoding order.

In an example embodiment of the present invention the transmission unit comprising multimedia data is a VCL NAL unit.

The present invention improves the buffering efficiency of the coding systems. By using the present invention it is possible to use a suitable amount of buffering actually required. Therefore, there is no need to allocate more memory than necessary for the encoding buffer in the encoding device and the pre-decoding buffer in the decoding device. Also, pre-decoding buffer overflow can be avoided.

DETAILED DESCRIPTION OF THE INVENTION

Figure 5:
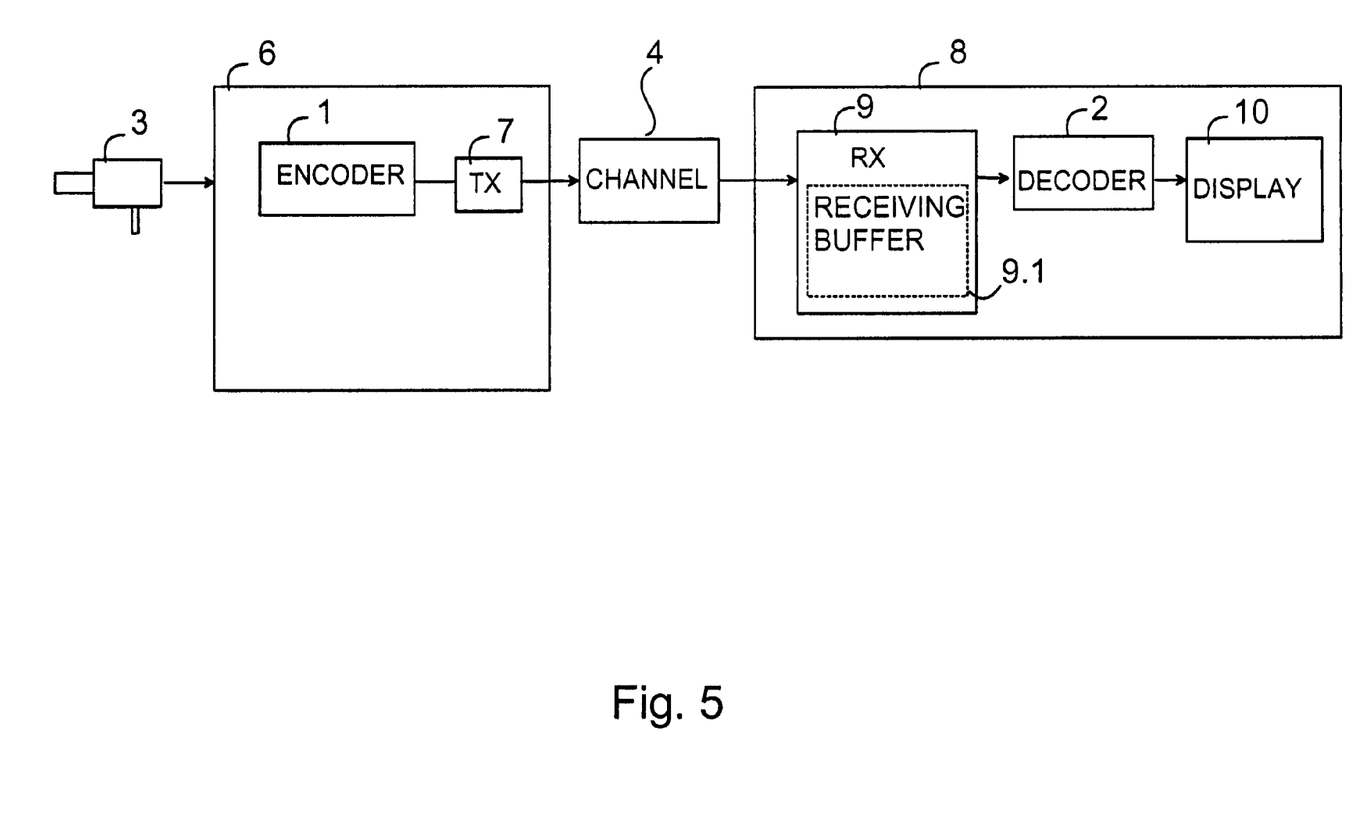
FIG. 5 depicts an advantageous embodiment of the system according to the present invention.
Figure 6:
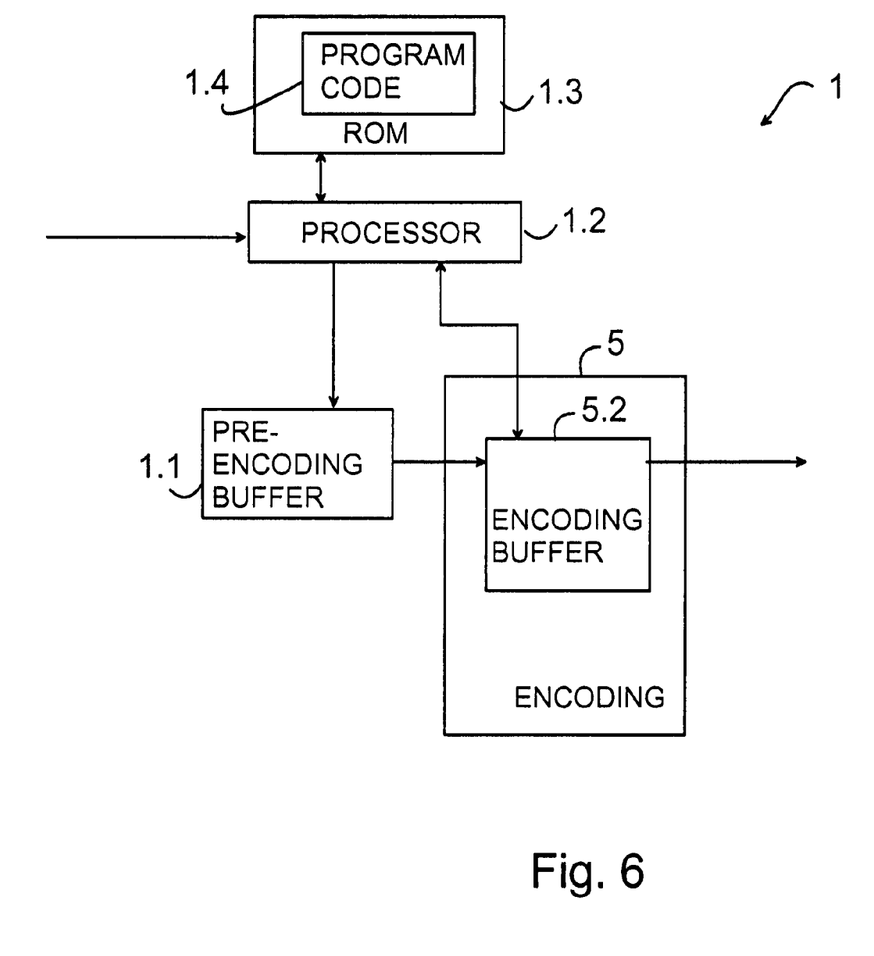
FIG. 6 depicts an advantageous embodiment of the encoder according to the present invention.
Figure 7:
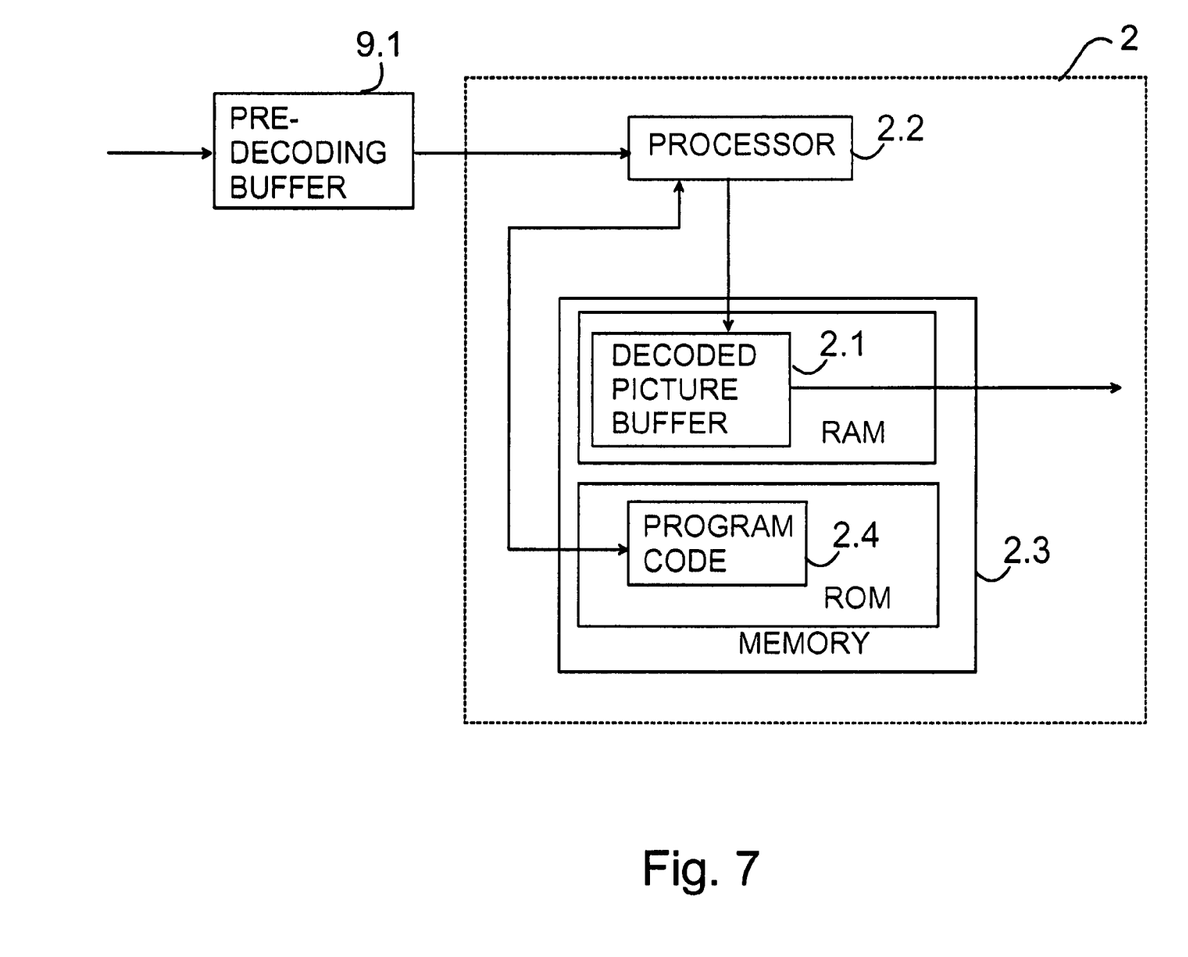
FIG. 7 depicts an advantageous embodiment of the decoder according to the present invention.

In the following the invention will be described in more detail with reference to the system of FIG. 5, the encoder 1 of FIG. 6 and decoder 2 of FIG. 7. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 6) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream.

From the encoding process the encoded pictures are moved to an encoded picture buffer 5.2, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures.

The decoder 1 also includes a memory 2.3 and a processor 2.2 in which the decoding tasks according to the invention can be applied.

The memory 2.3 and the processor 2.2 can be common with the receiving device 8 or the receiving device 8 can have another processor and/or memory (not shown) for other functions of the receiving device 8.

Encoding

Let us now consider the encoding-decoding process in more detail. Pictures from the video source 3 are received by the encoder 1 and advantageously stored in the encoding buffer 1.1. The encoding process is not necessarily started immediately after the first picture is received by the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can be, for example, predicted pictures (P), bi-predictive pictures (B), and/or intra-coded pictures (I). The intra-coded pictures can be decoded without using any other pictures, but other type of pictures need at least one reference picture before they can be decoded. Pictures of any of the above mentioned picture types can be used as a reference picture.

The encoder advantageously attaches two time stamps to the pictures: a decoding time stamp (DTS) and output time stamp (OTS). The decoder can use the time stamps to determine the correct decoding time and time to output (display) the pictures. However, those time stamps are not necessarily transmitted to the decoder or it does not use them.

The NAL units can be delivered in different kind of packets. In this advantageous embodiment the different packet formats include simple packets and aggregation packets. The aggregation packets can further be divided into single-time aggregation packets and multi-time aggregation packets.

The payload format of RTP packets is defined as a number of different payload structures depending on need. However, which structure a received RTP packet contains is evident from the first byte of the payload. This byte will always be structured as a NAL unit header. The NAL unit type field indicates which structure is present. The possible structures are: Single NAL Unit Packet, Aggregation packet and Fragmentation unit. The Single NAL Unit Packet contains only a single NAL unit in the payload. The NAL header type field will be equal to the original NAL unit type, i.e., in the range of 1 to 23, inclusive. The Aggregation packet type is used to aggregate multiple NAL units into a single RTP payload. This packet exists in four versions, the Single-Time Aggregation Packet type A (STAP-A), the Single-Time Aggregation Packet type B (STAP-B), Multi-Time Aggregation Packet (MTAP) with 16 bit offset (MTAP16), and Multi-Time Aggregation Packet (MTAP) with 24 bit offset (MTAP24). The NAL unit type numbers assigned for STAP-A, STAP-B, MTAP16, and MTAP24 are 24, 25, 26, and 27 respectively. The Fragmentation unit is used to fragment a single NAL unit over multiple RTP packets. It exists with two versions identified with the NAL unit type numbers 28 and 29.

There are three cases of packetization modes defined for RTP packet transmission:
Single NAL unit mode,
Non-interleaved mode, and
Interleaved mode.

The single NAL unit mode is targeted for conversational systems that comply with ITU-T Recommendation H.241. The non-interleaved mode is targeted for conversational systems that may not comply with ITU-T Recommendation H.241. In the non-interleaved mode NAL units are transmitted in NAL unit decoding order. The interleaved mode is targeted for systems that do not require very low end-to-end latency. The interleaved mode allows transmission of NAL units out of NAL unit decoding order.

The packetization mode in use may be signaled by the value of the optional packetization-mode MIME parameter or by external means. The used packetization mode governs which NAL unit types are allowed in RTP payloads.

In the interleaved packetization mode, the transmission order of NAL units is allowed to differ from the decoding order of the NAL units. Decoding order number (DON) is a field in the payload structure or a derived variable that indicates the NAL unit decoding order.

The coupling of transmission and decoding order is controlled by the optional interleaving-depth MIME parameter as follows. When the value of the optional interleaving-depth MIME parameter is equal to 0 and transmission of NAL units out of their decoding order is disallowed by external means, the transmission order of NAL units conforms to the NAL unit decoding order. When the value of the optional interleaving-depth MIME parameter is greater than 0 or transmission of NAL units out of their decoding order is allowed by external means, the order of NAL units in an Multi-Time Aggregation Packet 16 (MTAP16) and an Multi-Time Aggregation Packet 24 (MTAP24) is not required to be the NAL unit decoding order, and the order of NAL units composed by decapsulating Single-Time Aggregation Packets B (STAP-B), MTAPs, and Fragmentation Units (FU) in two consecutive packets is not required to be the NAL unit decoding order.

The RTP payload structures for a single NAL unit packet, an STAP-A, and an FU-A do not include DON. STAP-B and FU-B structures include DON, and the structure of MTAPs enables derivation of DON.

If a transmitter wants to encapsulate one NAL unit per packet and transmit packets out of their decoding order, STAP-B packet type can be used.

In the single NAL unit packetization mode, the transmission order of NAL units is the same as their NAL unit decoding order. In the non-interleaved packetization mode, the transmission order of NAL units in single NAL unit packets and STAP-As, and FU-As is the same as their NAL unit decoding order. The NAL units within a STAP appear in the NAL unit decoding order.

Due to the fact that H.264 allows the decoding order to be different from the display order, values of RTP timestamps may not be monotonically non-decreasing as a function of RTP sequence numbers.

The DON value of the first NAL unit in transmission order may be set to any value. Values of DON are in the range of 0 to 65535, inclusive. After reaching the maximum value, the value of DON wraps around to 0.

A video sequence according to this specification can be any part of NALU stream that can be decoded independently from other parts of the NALU stream.

An example of robust packet scheduling follows.

In the following the invention will be described in more detail with reference to the system of FIG. 5, the encoder 1 of FIG. 6 and decoder 2 of FIG. 7. The pictures to be encoded can be, for example, pictures of a video stream on a signal received from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 6) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream.

A subset of pictures in multiple video sequences is depicted below in output order.

The encoding (and decoding) order of these pictures is from left to right as follows:

Decoding order number (DON) for a picture is equal to the value of DON for the previous picture in decoding order plus one.

For the sake of simplicity, let us assume that:
the frame rate of the sequence is constant,
each picture consists of only one slice,
each slice is encapsulated in a single NAL unit packet,
pictures are transmitted in decoding order, and
pictures are transmitted at constant intervals (that is equal to 1/frame rate).

Thus, pictures are received in decoding order:

The num-reorder-VCL-NAL-units parameter is set to 0, because no buffering is needed to recover the correct decoding order from transmission (or reception order).

The decoder has to buffer for one picture interval initially in its decoded picture buffer to organize pictures from decoding order to output order as depicted below:

The amount of required initial buffering in the decoded picture buffer can be signalled in the buffering period SEI message or in the value of the num_reorder_frames syntax element of H.264 video usability information. num_reorder_frames indicates the maximum number of frames, complementary field pairs, or non-paired fields that precede any frame, complementary field pair, or non-paired field in the sequence in decoding order and follow it in output order.

For the sake of simplicity, it is assumed that num_reorder_frames is used to indicate the initial buffer in the decoded picture buffer. In this example, num_reorder_frames is equal to 1.

It can be observed that if the IDR picture I00 is lost during transmission, and a retransmission request is issued when the value of the system clock is 62, there is one picture interval of time (until the system clock reaches timestamp 63) to receive the retransmitted IDR picture I00.

Let us then assume that IDR pictures are transmitted two frame intervals earlier than their decoding position, i.e., the pictures are transmitted in the following order:

Let variable id1 be specified according to prior art (as disclosed in draft-ietf-avt-rtp-h264-01.txt), i.e., it specifies the maximum amount of VCL NAL units that precede any VCL NAL unit in the NAL unit stream in NAL unit decoding order and follow the VCL NAL unit in RTP sequence number order or in the composition order of the aggregation packet containing the VCL NAL unit. Let variable id2 be specified according to the present invention, i.e., it specifies the maximum amount of VCL NAL units that precede any VCL NAL unit in the NAL unit stream in transmission order and follow the VCL NAL unit in decoding order.

In the example, the value of id1 is equal to 2 and the value of id2 is equal to 1. As already shown in section 2, the value of id1 is not proportional to the time or buffering space required for initial buffering to reorder packets from reception order to decoding order. In this example, an initial buffering time equal to one picture interval is required to recover the decoding order as illustrated below (the figure presents the output of the receiver buffering process). This example also demonstrates that the value of initial buffering time and buffering space can be concluded according to the invention.

Again, an initial buffering delay of one picture interval is needed to organize pictures from decoding order to output order as depicted below:

| ... | N58 | N59 | I00 | N01 | N02 | R03 | N04 | N05 | R06 | ... |
|---|---|---|---|---|---|---|---|---|---|---|
| ... | 64 | 65 | 66 | 67 | 68 | 69 | 70 | 71 | 72 | ... |

It can be observed that the maximum delay that IDR pictures can undergo during transmission, including possible application, transport, or link layer retransmission, is equal to num_reorder_frames+id2. Thus, the loss resiliency of IDR pictures is improved in systems supporting retransmission.

The receiver is able to organize pictures in decoding order based on the value of DON associated with each picture.

Transmission

The transmission and/or storing of the encoded pictures (and the optional virtual decoding) can be started immediately after the first encoded picture is ready. This picture is not necessarily the first one in decoder output order because the decoding order and the output order may not be the same.

When the first picture of the video stream is encoded the transmission can be started. The encoded pictures are optionally stored to the encoded picture buffer 1.1. The transmission can also start at a later stage, for example, after a certain part of the video stream is encoded.

The decoder 2 should also output the decoded pictures in correct order, for example by using the ordering of the picture order counts.

De-Packetizing

The de-packetization process is implementation dependent. Hence, the following description is a non-restrictive example of a suitable implementation. Other schemes may be used as well. Optimizations relative to the described algorithms are likely possible.

The general concept behind these de-packetization rules is to reorder NAL units from transmission order to the NAL unit delivery order.

Decoding

Next, the operation of the receiver 8 will be described. The receiver 8 collects all packets belonging to a picture, bringing them into a reasonable order. The strictness of the order depends on the profile employed. The received packets are stored into the receiving buffer 9.1 (pre-decoding buffer). The receiver 8 discards anything that is unusable, and passes the rest to the decoder 2. Aggregation packets are handled by unloading their payload into individual RTP packets carrying NALUs. Those NALUs are processed as if they were received in separate RTP packets, in the order they were arranged in the Aggregation Packet.

Hereinafter, let N be the value of the optional num-reorder-VCL-NAL-units parameter (interleaving-depth parameter) which specifies the maximum amount of VCL NAL units that precede any VCL NAL unit in the packet stream in NAL unit transmission order and follow the VCL NAL unit in decoding order. If the parameter is not present, a 0 value number could be implied.

When the video stream transfer session is initialized, the receiver 8 allocates memory for the receiving buffer 9.1 for storing at least N pieces of VCL NAL units. The receiver then starts to receive the video stream and stores the received VCL NAL units into the receiving buffer. The initial buffering lasts
  until at least N pieces of VCL NAL units are stored into the receiving buffer 9.1, or
  if max-don-diff MIME parameter is present, until the value of a function don_diff(m,n) is greater than the value of max-don-diff, in which n corresponds to the NAL unit having the greatest value of AbsDON among the received NAL units and m corresponds to the NAL unit having the smallest value of AbsDON among the received NAL units, or
  until initial buffering has lasted for the duration equal to or greater than the value of the optional init-buf-time MIME parameter.

The function don_diff(m,n) is specified as follows:
  If DON(m)==DON(n), don_diff(m,n)=0
  If (DON(m)<DON(n) and DON(n)−DON(m)<32768), don_diff(m,n)=DON(n)−DON(m)
  If (DON(m)>DON(n) and DON(m)−DON(n)>=32768), don_diff(m,n)=65536−DON(m)+DON(n)
  If (DON(m)<DON(n) and DON(n)−DON(m)>=32768), don_diff(m,n)=−(DON(m)+65536−DON(n))
  If (DON(m)>DON(n) and DON(m)−DON(n)<32768), don_diff(m,n)=−(DON(m)−DON(n))
where DON(i) is the decoding order number of the NAL unit having index i in the transmission order.

A positive value of don_diff(m,n) indicates that the NAL unit having transmission order index n follows, in decoding order, the NAL unit having transmission order index m.

AbsDON denotes such decoding order number of the NAL unit that does not wrap around to 0 after 65535. In other words, AbsDON is calculated as follows:

Let m and n are consecutive NAL units in transmission order. For the very first NAL unit in transmission order (whose index is 0), AbsDON(0)=DON(0). For other NAL units, AbsDON is calculated as follows:
  If DON(m)==DON(n), AbsDON(n)=AbsDON(m)
  If (DON(m)<DON(n) and DON(n)−DON(m)<32768), AbsDON(n)=AbsDON(m)+DON(n)−DON(m)
  If (DON(m)>DON(n) and DON(m)−DON(n)>=32768), AbsDON(n)=AbsDON(m)+65536−DON(m)+DON(n)
  If (DON(m)<DON(n) and DON(n)−DON(m)>=32768), AbsDON(n)=AbsDON(m)−(DON(m)+65536−DON(n))
  If (DON(m)>DON(n) and DON(m)−DON(n)<32768), AbsDON(n)=AbsDON(m)−(DON(m)−DON(n))
where DON(i) is the decoding order number of the NAL unit having index i in the transmission order.

When the receiver buffer 9.1 contains at least N VCL NAL units, NAL units are removed from the receiver buffer 9.1 one by one and passed to the decoder 2. The NAL units are not necessarily removed from the receiver buffer 9.1 in the same order in which they were stored, but according to the DON of the NAL units, as described below. The delivery of the packets to the decoder 2 is continued until the buffer contains less than N VCL NAL units, i.e. N−1 VCL NAL units.

The NAL units to be removed from the receiver buffer are determined as follows:
  If the receiver buffer contains at least N VCL NAL units, NAL units are removed from the receiver buffer and passed to the decoder in the order specified below until the buffer contains N−1 VCL NAL units.
  If max-don-diff is present, all NAL units m for which don_diff(m,n) is greater than max-don-diff are removed from the receiver buffer and passed to the decoder in the order specified below. Herein, n corresponds to the NAL unit having the greatest value of AbsDON among the received NAL units.
  A variable ts is set to the value of a system timer that was initialized to 0 when the first packet of the NAL unit stream was received. If the receiver buffer contains a NAL unit whose reception time tr fulfills the condition that ts−tr>init-buf-time, NAL units are passed to the decoder (and removed from the receiver buffer) in the order specified below until the receiver buffer contains no NAL unit whose reception time tr fulfills the specified condition.

The order that NAL units are passed to the decoder is specified as follows.

Let PDON be a variable that is initialized to 0 at the beginning of the an RTP session. For each NAL unit associated with a value of DON, a DON distance is calculated as follows. If the value of DON of the NAL unit is larger than the value of PDON, the DON distance is equal to DON−PDON. Otherwise, the DON distance is equal to 65535−PDON+DON+1.

NAL units are delivered to the decoder in ascending order of DON distance. If several NAL units share the same value of DON distance, they can be passed to the decoder in any order. When a desired number of NAL units have been passed to the decoder, the value of PDON is set to the value of DON for the last NAL unit passed to the decoder.

The DPB 2.1 contains memory places for storing a number of pictures. Those places are also called as frame stores in the description. The decoder 2 decodes the received pictures in correct order.

The present invention can be applied in many kind of systems and devices. The transmitting device 6 including the encoder 1 advantageously include also a transmitter 7 to transmit the encoded pictures to the transmission channel 4. The receiving device 8 include the receiver 9 to receive the encoded pictures, the decoder 2, and a display 10 on which the decoded pictures can be displayed. The transmission channel can be, for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into the memory 1.3. Respectively, the program code 2.4 of the decoder can be stored into the memory 2.3.

The invention claimed is:

1. A method comprising:
   receiving media data, and
   buffering the media data in a buffer to construct a packet stream, the media data being included in data transmission units, the data transmission units ordered in a transmission order which is at least partly different from a decoding order of the media data in the data transmission units, wherein a parameter is defined indicative of the maximum number of data transmission units which have an earlier transmission order and a later decoding order than another data transmission unit in a packet stream; and
   providing said parameter to a decoder to determine buffering requirements.

2. The method according to claim 1, wherein said media data comprises a slice of an encoded picture.

3. The method according to claim 1, wherein said transmission unit comprising media data is a video coding layer network abstraction layer unit.

4. A method, comprising
   receiving an encoded picture stream,
   receiving a parameter indicative of a maximum number of data transmission units that have an earlier transmission order and a later decoding order than another data transmission unit in the encoded picture stream; and
   decoding the encoded picture stream in a decoder, wherein the encoded picture stream is received as data transmission units comprising media data, the data transmission units having been ordered in a transmission order which is at least partly different from a decoding order of the media data in the data transmission units, wherein buffering of the data transmission units is performed, wherein buffering requirements are determined for said decoding on the basis of said parameter.

5. A system comprising
   an encoder for encoding pictures; and
   a buffer for buffering media data, the media data being included in data transmission units, the data transmission units having been ordered in a transmission order which is at least partly different from a decoding order of the media data in the data transmission units, wherein a parameter is arranged to be defined indicative of a maximum number of data transmission units that have an earlier transmission order and a later decoding order than another data transmission unit in the packet stream in transmission order and follow the data transmission unit in the decoding order to be provided to a decoder to determine buffering requirements.

6. The system according to claim 5, further comprising a decoder for decoding encoded pictures, and a memory module for buffering decoded pictures, wherein said parameter is arranged to be used for determining a required amount of memory places to be reserved from the memory for buffering decoded pictures.

7. The system according to claim 5, wherein said media data comprises a slice of an encoded picture.

8. The system according to claim 5, wherein said data transmission unit is a video coding layer network abstraction layer unit.

9. Apparatus, comprising:
   an encoder responsive to a signal from a media source for providing an encoded media stream with media data encoded in transmission units, the data transmission units ordered in a transmission order which is at least partly different from a decoding order of the media data in the data transmission units, wherein said media stream is arranged to contain a parameter indicative of a maximum number of data transmission units that have an earlier transmission order and a later decoding order than another data transmission unit in the media stream in transmission order and follow the data transmission unit in the decoding order; and
   a transmitter, responsive to the encoded media stream, for transmitting the media stream in said data transmission units over a transmission medium or to a storage medium, and for transmitting said parameter to a decoder to determine buffering requirements.

10. A receiving device for receiving a parameter and an encoded picture stream as data transmission units comprising media data, the data transmission units ordered in a transmission order which is at least partly different from a decoding order of the media data in the data transmission units, wherein said parameter is arranged to be used indicative of a maximum number of transmission units that have an earlier transmission order and a later decoding order than another data transmission unit in the picture stream in transmission order and follow the data transmission unit in the decoding order.

11. The receiving device according to claim 10, further comprising a memory module, and a definer for examining said parameter and for reserving memory places for buffering from said memory according to said parameter.

12. The receiving device according to claim 11, further comprising a decoder for decoding pictures from the received encoded picture stream, wherein the receiving device is configured for using the reserved memory places for buffering the encoded pictures.

13. A computer program product including a non-transitory computer readable storage medium embodying computer program code comprising machine executable steps for buffering media data of encoded pictures in a buffer, the media data being included in data transmission units, the data transmission units having been ordered in a transmission order which is at least partly different from a decoding order of the media data in the data transmission units, wherein the computer program code further comprises machine executable steps for defining a parameter indicative of a maximum number of data transmission units that have an earlier transmission order and a later decoding order than another data transmission unit in the packet stream in transmission order and follow the data transmission unit in the decoding order to be provided to a decoder to determine buffering requirements.

14. An apparatus comprising:
at least one processor; and
at least one memory including computer program code, the at least one memory and the computer program code configured to, with the at least one processor, cause the apparatus at least to:
receive an encoded picture stream as data transmission units comprising media data, the data transmission units ordered in a transmission order which is at least partly different from a decoding order of the media data in the data transmission units, wherein a parameter is arranged to be used indicative of a maximum number of data transmission units that have an earlier transmission order and a later decoding order than another data transmission unit in the packet stream in transmission order and follow the data transmission unit in the decoding order;
decode the encoded picture stream to provide decoded data transmission units; and
buffer the decided data transmission units based on said parameter.

15. A method, comprising the steps of:
decoding media data in transmission units in a stream received over a transmission channel, the transmission units ordered in a transmission order which is at least partly different from a decoding order thereof,
examining a parameter indicative of a maximum amount of data transmission units that have an earlier transmission order and a later decoding order than another transmission unit in the stream in transmission order and follow the data transmission unit in the decoding order, and
buffering said media data according to said parameter.

16. A system, comprising:
a transmitter for transmitting encoded pictures comprising media data in transmission units ordered in a transmission order which is at least partly different from a decoding order thereof and for which transmission units a parameter is defined indicative of a maximum amount of transmission units that have an earlier transmission order and a later decoding order than another transmission unit in transmission order and follow the transmission unit in decoding order for transmission over a transmission channel, wherein said transmitter is further for transmitting said parameter to a decoder to determine buffering requirements; and
a receiver for receiving said encoded pictures for decoding said encoded pictures for buffering in a memory for storing decoded pictures in memory places reserved according to said parameter.

17. Device comprising:
means for decoding media data in transmission units in a stream received over a transmission channel, the transmission units ordered in a transmission order which is at least partly different from a decoding order thereof;
means for examining a parameter indicative of a maximum amount of data transmission units that have an earlier transmission order and a later decoding order than another transmission unit in the stream in transmission order and follow the data transmission unit in the decoding order; and
means for buffering said media data according to said parameter.

18. The method according to claim 1, wherein said media data comprises at least one of the following:
video data,
audio data.

19. The method according to claim 4, wherein said parameter is examined, and memory places are reserved for buffering according to said parameter.

20. The receiving device according to claim 11, wherein pictures are decoded from the received encoded picture stream, and encoded pictures are buffered using the reserved memory places.

21. The apparatus according to claim 9, wherein said media data comprises a slice of an encoded picture.

22. The apparatus according to claim 9, wherein said transmission units are video coding layer network abstraction layer units.

23. A non-transitory computer readable storage medium having a computer program stored thereon, said program embodying computer program code comprising machine executable steps for decoding an encoded picture stream, in which the encoded picture stream is received as transmission units comprising media data, and machine executable steps for buffering transmission units, wherein the computer program code comprises machine executable steps for determining buffering requirements for said decoding by using a parameter indicative of a maximum amount of transmission units comprising media data that have an earlier transmission order and a later decoding order than another transmission unit in transmission order and follow the transmission unit in decoding order.

24. A device for transmitting, comprising:
a processor for processing media data by defining a parameter indicative of a maximum amount of transmission units comprising media data that have an earlier transmission order and a later decoding order than another transmission unit comprising media data in a packet stream in transmission unit transmission order and follow the transmission unit comprising media data in decoding order; and
an output for transmitting said parameter to be provided to a decoder to determine buffering requirements, and said transmission units.

25. The device for transmitting according to claim 24, wherein said media data comprises a slice of an encoded picture.

26. The device for transmitting according to claim 24, wherein said transmission unit is a video coding layer network abstraction layer unit.

27. A device for receiving, comprising:
an input for receiving an encoded picture stream data as transmission units comprising slice data; and a processor for processing data of said transmission units, wherein the processor is configured for determining buffering requirements by using a parameter indicative of a maximum amount of transmission units that have an earlier transmission order and a later decoding order than another transmission unit comprising in transmission unit transmission order and follow the transmission unit in decoding order.

28. The device for receiving according to claim 27, further comprising a memory module coupled to said processor, said processor for examining said parameter and for reserving memory places for buffering use of said memory according to said parameter.

29. The device for receiving according to claim 28, for decoding pictures from the received encoded picture stream, wherein the processor is configured for using the reserved memory places for buffering the encoded pictures.

30. An encoder for encoding media data included in data transmission units, the data transmission units ordered in a transmission order which is at least partly different from a decoding order of the media data in the data transmission units, wherein the encoder comprises a processor coupled to a memory, said processor together with said memory configured to define a parameter indicative of a maximum number of data transmission units that have a transmission order and a later decoding order than another data transmission unit in the packet stream in transmission order and follow the data transmission unit in the decoding order to be provided to a decoder to determine buffering requirements.

31. The encoder according to claim 30, wherein said media data comprises a slice of an encoded picture.

32. The encoder according to claim 30, wherein said transmission unit is a video coding layer network abstraction layer unit.

33. A decoder for decoding an encoded picture stream included in data transmission units comprising media data, the data transmission units ordered in a transmission order which is at least partly different from a decoding order of the media data in the data transmission units, wherein the decoder is configured to determine buffering requirements by using a parameter indicative of a maximum number of transmission units that have an earlier transmission order and a later decoding order than another data transmission unit in the picture stream in transmission order and follow the data transmission unit in the decoding order.

34. The decoder according to claim 33, further comprising a memory module and a processor configured to examine said parameter and to reserve memory places of said memory module according to said parameter.

35. The decoder according to claim 34, configured to use the reserved memory places for buffering pictures of the picture stream.

36. A method comprising:
receiving media data, and
buffering the media data in a buffer to construct a packet stream, the media data being included in data transmission units, the data transmission units ordered in a transmission order which is at least partly different from a decoding order of the data transmission units of the packet stream,
examining the transmission units in the buffer to determine how many data transmission units have an earlier transmission order and a later decoding order than any other data transmission unit in the packet stream,
on the basis of said examining evaluation the maximum number of such data transmission units which have an earlier transmission order and a later decoding order than said any other data transmission unit in the packet stream,
wherein a parameter is defined indicative of the maximum number of data transmission units that precede any one data transmission unit in the packet stream in the transmission order and follow said any one data transmission unit in the decoding order, and
provide said parameter to a decoder to determine buffering requirements.

* * * * *